L. E. WATERMAN.
LISTER.
APPLICATION FILED OCT. 12, 1911.
1,064,264.
Patented June 10, 1913.
2 SHEETS—SHEET 1.
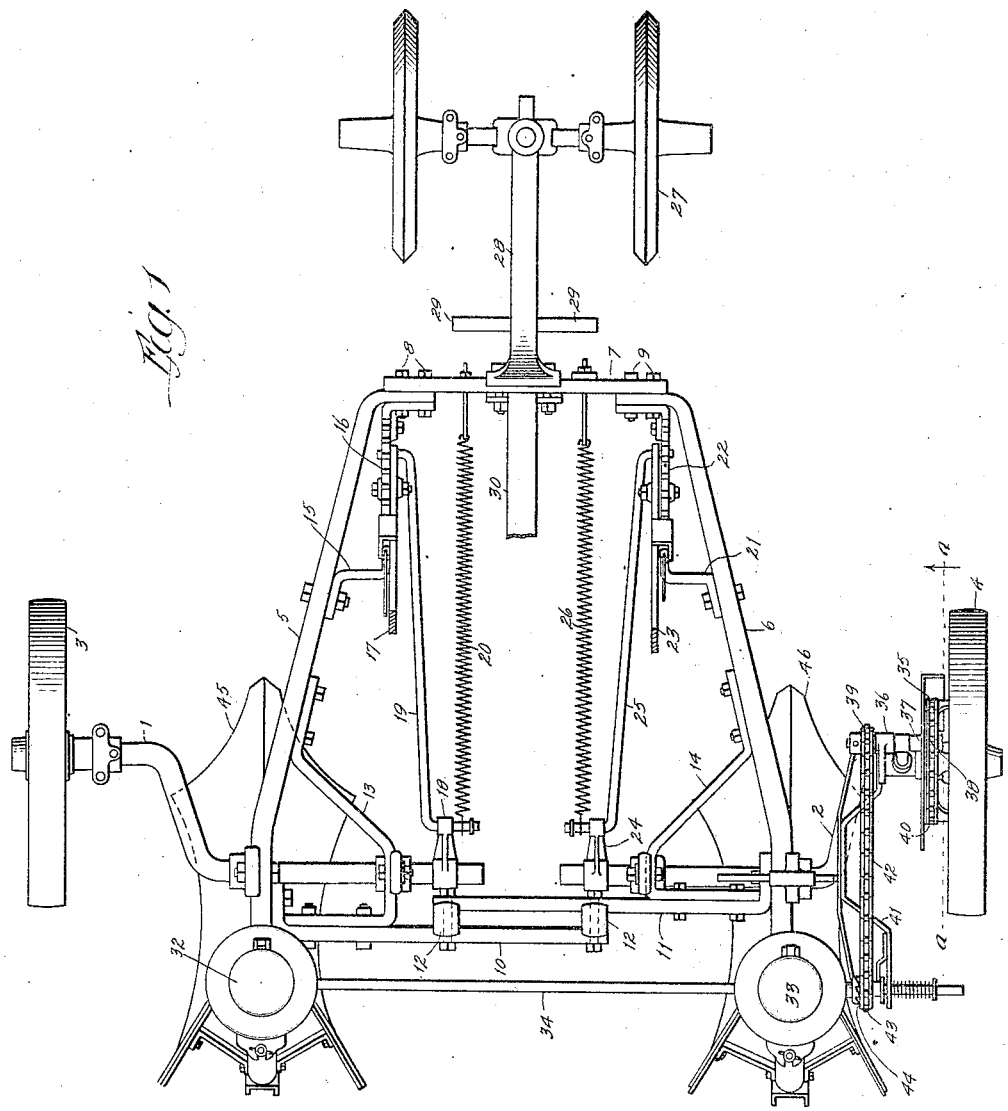
Witnesses:
Inventor
Lewis E. Waterman
By A. O. Behel
Atty L. E. WATERMAN.
LISTER.
APPLICATION FILED OCT. 12, 1911.
1,064,264.
Patented June 10, 1913.
2 SHEETS—SHEET 2.
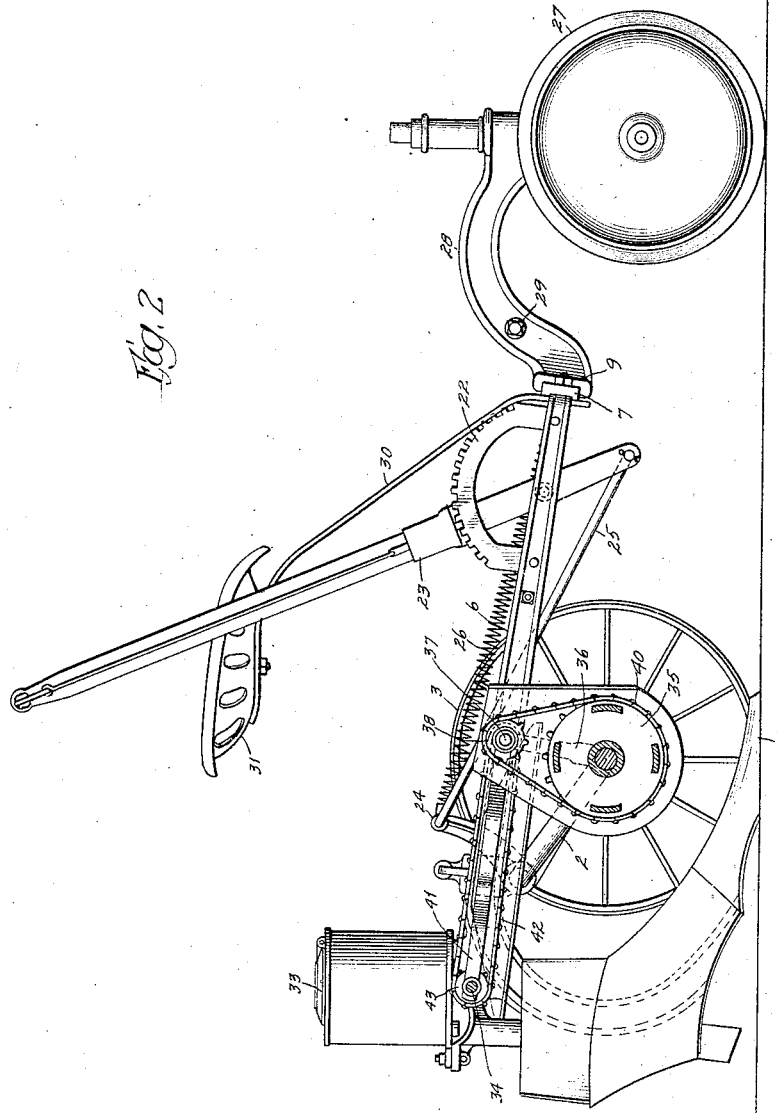

UNITED STATES PATENT OFFICE.

LEWIS E. WATERMAN, OF ROCKFORD, ILLINOIS, ASSIGNOR TO EMERSON-BRANTINGHAM COMPANY, OF ROCKFORD, ILLINOIS, A CORPORATION OF ILLINOIS.

LISTER.

1,064,264.

Specification of Letters Patent. Patented June 10, 1913.

Application filed October 12, 1911. Serial No. 654,402.

*To all whom it may concern:*

Be it known that I, LEWIS E. WATERMAN, a citizen of the United States, residing at Rockford, in the county of Winnebago and State of Illinois, have invented certain new and useful Improvements in Listers, of which the following is a specification.

The object of this invention is to support two furrow openers and two seed dropping mechanisms in a manner that they can be adjusted toward and from each other to vary the distance between the rows.

In the accompanying drawings, Figure 1 is a plan view. Fig. 2 is a section on line *a a* Fig. 1.

The cranked axles 1 and 2 are supported by the wheels 3 and 4. Two side bars 5 and 6 have their forward ends connected to a cross-bar 7 by the bolts 8 and 9 respectively. To each of the side-bars 5 and 6 is secured a bar 10 and 11 respectively, and these bars are connected by the clamps 12. Brace-bars 13 and 14 have one end connected to the side-bars 5 and 6 respectively, and their other ends are connected to the bars 10 and 11 respectively. The cranked axle 1 is connected to the side-bar 5 and to the brace-bar 13. The cranked axle 2 is connected to the side-bar 6, and to the brace-bar 14. The connections of the crank axles are such as to permit of an oscillatory movement of the cranked axles. The side-bar 5 has a corner brace-bar 15 which supports a toothed segment 16, and a hand lever 17 has the usual dog engagement with the toothed segment. An arm 18 has a connection with the cranked axle 1, and a link 19 connects this arm with the hand lever 17. A spring 20 has one end connected to the arm 18 and its other end is connected to the cross-bar 7. The side-bar 6 has a corner brace-bar 21 which supports a toothed segment 22, and a hand lever 23 has the usual dog engagement with the toothed segment. An arm 24 has a connection with the cranked axle 2, and a link 25 connects this arm with the hand lever 23. A spring 26 has one end connected to the arm and its other end is connected to the cross-bar.

The forward end of the frame is supported by the truck 27 having a connection with the cross-bar 7 through the arched bar 28, from which extend rests 29. A seat support 30 has one end connected to the cross-bar 7 and supports a seat 31. The side-bars 5 and 6 each support a seed box 32 and 33 respectively, and a shaft 34 serves to operate the seed dropping mechanism.

A sprocket wheel 35 rotates with the supporting wheel 4. A yoke 36 is supported loosely on the cranked axle 2, and it supports a short shaft 37 to which are connected two sprocket wheels 38 and 39. A chain 40 connects the sprocket wheels 35 and 38. A link 41 connects the shafts 34 and 37. A chain 42 connects the sprocket wheel 39 with a sprocket wheel 43 mounted on the shaft 34 and which has a connection with this shaft through the clutch 44.

By means of the hand-levers 17 and 23 the cranked-axles 1 and 2 can be rocked which will raise or lower the frame thereby raising or lowering the furrow openers 45 and 46 and the seed dropping mechanisms, the truck 27 serving to support the forward portion of the frame. When the frame is raised or lowered it can be held in this position by the hand-levers engaging the toothed segments 16 and 22. By loosening the clamps 12 and taking out the bolts 8 and 9, the side-bars 5 and 6 can be adjusted toward each other which will also move the seed boxes, furrow openers and supporting wheels 3 and 4. The links 41 will hold the shaft 37 the same distance from the shaft 34 in order that the chain 42 will remain tight.

I claim as my invention.

1. In a machine of the character set forth, the combination with a frame comprising a front cross bar, longitudinal side bars adjustably connected at their front ends to the front cross bar, and inwardly extending rear bars carried by the longitudinal bars and adjustably overlapped, of means for connecting the overlapping portions of the rear cross bars, a truck located in front of the front cross bar and having a connection therewith, seed dropping mechanisms carried by the rear portions of the longitudinal bars and adjustable therewith, independent crank axles journaled on the longitudinal bars, means for raising and lowering the frame upon the said axles, wheels journaled on the axles, and means for driving the seed dropping mechanisms from one of said wheels.

2. In a machine of the character set forth, the combination with a frame, comprising side bars that are relatively adjustable toward and from each other, a front truck for both side bars, independent rear supporting wheels for the side bars, cranked axle mountings for the wheels journaled on the side bars, means for swinging the cranked axles, seeding mechanisms carried by the side bars, a gear connection between one of the rear wheels and the seeding mechanism, including sprocket chains, and means for maintaining the sprocket chains at substantially the same degree of tightness irrespective of the adjustment of the frame.

In testimony whereof I have hereunto set my hand in presence of two subscribing witnesses.

LEWIS E. WATERMAN.

Witnesses:
A. O. BEHEL,
E. D. E. N. BEHEL.